US012587541B2

(12) United States Patent
Chunduru Venkata et al.

(10) Patent No.: US 12,587,541 B2
(45) Date of Patent: Mar. 24, 2026

(54) SECURE CONNECTION BROKER FOR SWARM COMMUNICATIONS

(71) Applicant: VERIZON PATENT AND LICENSING INC., Basking Ridge, NJ (US)

(72) Inventors: Sivanaga Ravi Kumar Chunduru Venkata, Irving, TX (US); Kelly M. Paone, Chester, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 128 days.

(21) Appl. No.: 18/508,345

(22) Filed: Nov. 14, 2023

(65) Prior Publication Data

US 2025/0158997 A1 May 15, 2025

(51) Int. Cl.
*H04L 29/06* (2006.01)
*H04L 9/40* (2022.01)
(52) U.S. Cl.
CPC .......... *H04L 63/107* (2013.01); *H04L 63/166* (2013.01); *H04L 63/20* (2013.01)
(58) Field of Classification Search
None
See application file for complete search history.

(56) References Cited

U.S. PATENT DOCUMENTS

| | | | |
|---|---|---|---|
| 2011/0238984 A1* | 9/2011 | Roush ..................... | G06F 21/53 |
| | | | 713/166 |
| 2016/0050525 A1* | 2/2016 | Droll ..................... | H04W 4/023 |
| | | | 455/456.3 |
| 2016/0366102 A1* | 12/2016 | Smith ................... | H04L 9/0841 |
| 2019/0386957 A1* | 12/2019 | Leon ................... | H04L 63/0876 |
| 2021/0243595 A1* | 8/2021 | Buck ..................... | G06F 21/604 |
| 2022/0078696 A1* | 3/2022 | Saxena ................... | H04W 8/08 |
| 2022/0151450 A1* | 5/2022 | Case ..................... | B25J 13/003 |
| 2024/0414212 A1* | 12/2024 | Muñoz De La Torre Alonso ....... | |
| | | | H04L 65/1045 |

* cited by examiner

*Primary Examiner* — Benjamin E Lanier

(57) ABSTRACT

Disclosed are systems and methods for a computerized framework that operates a secure connection broker (SCB) for management and control of swarm communications. The SCB can define secure zones within a network(s), which can be leveraged to control and/or divert network traffic related to resource requests between entities based on the entities' designed zones. Secure zones, as managed by the SCB can serve as coordination centers for swarm activities among entities, thereby facilitating communication and data sharing among swarm members. The SCB(s) on a network can ensure that swarm communications are secure, controlled and efficient by providing a structured and protected environment for swarm nodes to operate.

17 Claims, 6 Drawing Sheets

Secure Connection Broker 200

Request module
202

Policy module
206

Zone module
204

Connection module
208

SECURE CONNECTION BROKER FOR SWARM COMMUNICATIONS

BACKGROUND INFORMATION

Swarm communications refer to the collective and coordinated communications among a group of interrelated entities, such as drones, robots, sensors and/or any other type of device capable of network communications, often referred to as a "swarm."

BRIEF DESCRIPTION OF THE DRAWINGS

The features and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION OF EXAMPLE EMBODIMENTS

Figure 1:
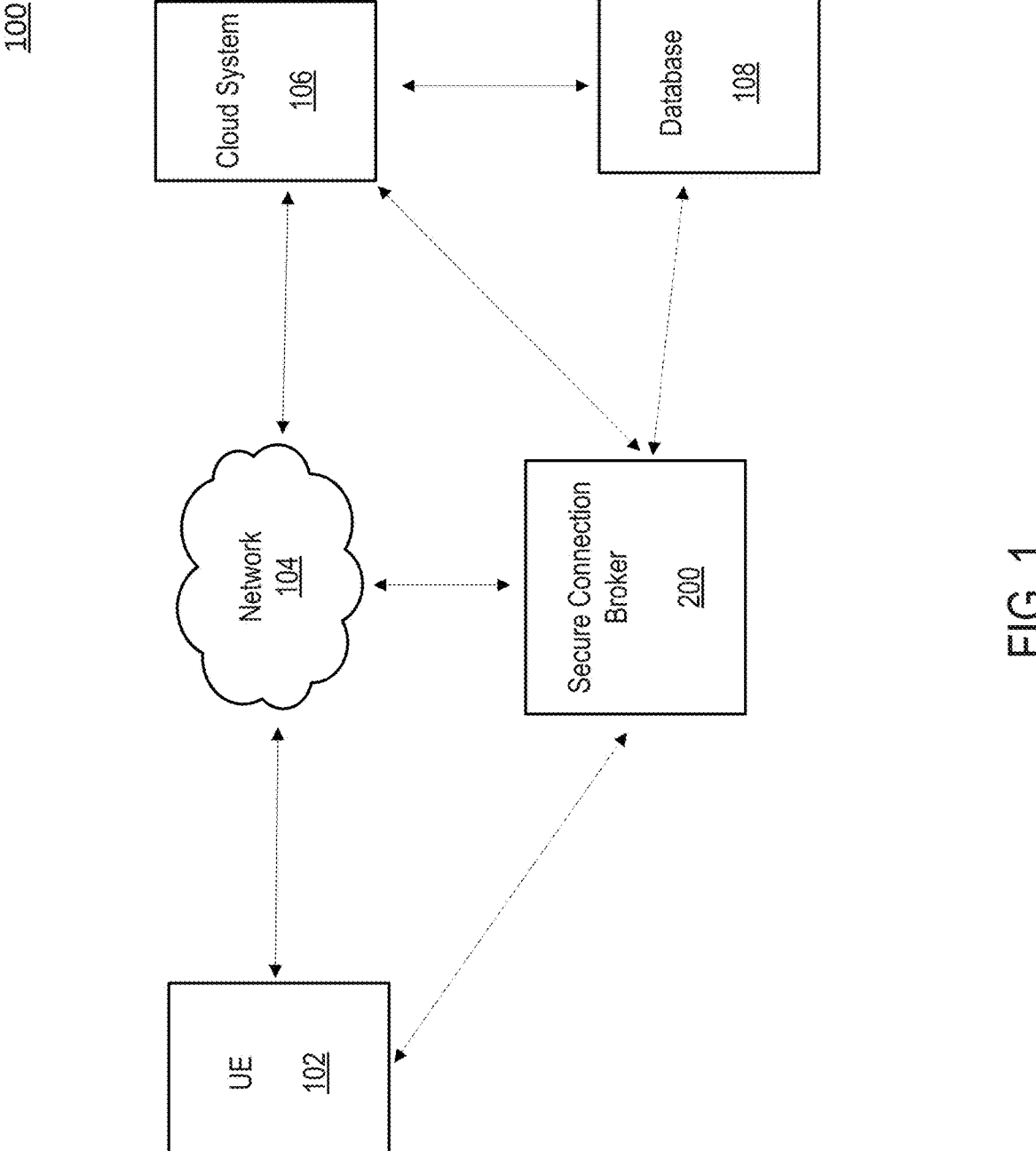
FIG. 1 is a block diagram of an example network architecture according to some embodiments of the present disclosure.

A group of entities, or swarm, can include, but are not limited to, drones, robots, sensors and/or any other type of device capable of network communications. According to some embodiments, swarm communications and decision-making processes can be distributed across multiple entities. Each entity can make autonomous decisions based on local information and share data with others for collaborative tasks.

According to some embodiments, entities within a swarm can operate according to coordinated behaviors, in that, for example, they can work together to achieve common goals or objectives. For example, entities within a swarm can communicate and exchange information to coordinate their actions, adapt to changing conditions, and optimize their collective behavior. Moreover, swarm communications often involve self-organizing principles, where entities in the swarm adapt and coordinate their actions without external intervention. This can lead to emergent behaviors and efficient problem-solving.

As discussed in detail below, according to some embodiments, entities in the swarm can share data and information in real-time (or substantially in real-time) to maintain situational awareness, avoid collisions, optimize routes and/or perform other collaborative tasks. As detailed herein, communication is a critical aspect of swarm entities' collective intelligence. Indeed, swarm communications can scale to accommodate various group sizes, from small swarms to large-scale deployments, via communication protocols designed to handle the dynamic nature of swarm entities, as discussed herein.

According to some embodiments, entities within a swarm can correspond to and/or be designated to a "zone." Accordingly, as discussed below, a zone can correspond to a logical group of entities (or network endpoints, such as, but not limited to, applications, data centers and/or any other locatable network location, for example) that are trusted, such that encryption among the entities may not be required.

According to some embodiments, a zone (or secured zone, used interchangeably) is a designated area within a network where specific security measures and access controls are applied to protect sensitive data, resources and/or services. Secure zones can be implemented to isolate, safeguard and control access to critical assets and/or information. For example, zones can be commonly used in various environments, such as corporate networks, data centers and industrial control systems.

According to some embodiments, zones can have characteristics corresponding to their access control, security policies, data encryption, monitoring and logging, role-based access control, and the like. For example, in some embodiments, zones can have strict access controls in place, such that only authorized users, devices and/or entities are granted access to data housed within or in relation to a zone and/or its credentials. In some embodiments, each zone can have its own set of security policies and rules that define what is allowed and what is prohibited within the zone. Such policies are housed and provided via a secure connection broker, as discussed below, can govern technical aspects, such as, data access, communication protocols, security configurations, and the like.

In some embodiments, data shared within and/or across zones can be encrypted to protect it from unauthorized access, such that encryption can be used to secure data both in transit and at rest (e.g., when stored). Zones, inclusive of the operating entities and/or communications occurring therein, can be monitored for any suspicious activities or security breaches. Logging and auditing mechanisms can be enacted to track events and detect potential threats.

In some embodiments, access to resources within a secure zone can be based on an entity's role or responsibilities. Thus, in some embodiments, role-based access control (RBAC) can ensure that entities only have access to what they need for a specific purpose (for example, an autonomous car requesting traffic data for a particular neighborhood it is patrolling).

Applications of swarm communications, within and between zones can be diverse and include scenarios, such as, but not limited to, drone swarms for search and rescue missions, autonomous vehicle networks, sensor networks for environmental monitoring, and even collaborative robotics in manufacturing. Effective swarm communications are crucial for ensuring the safe and efficient operation of these systems, as entities within the swarm must work together harmoniously to achieve their objectives.

As such, according to some embodiments, the disclosed systems and methods provide a computerized framework for implementation of a secure connection broker (SCB) that can be used for swarm communications.

According to some embodiments, an SCB can define secure zones within a network(s), whereby such zones can be categorized based on factors, such as, but not limited to, function, location, security requirements, and the like. In some embodiments, entities (e.g., devices, drones and robots) that form part of a swarm can be authenticated, whereby authorization can be provided via interaction with the SCB in order for such entities to join and/or interact with other entities associated with a zone.

In some embodiments, once authorized, swarm entities, which can function as interconnected nodes within the swarm infrastructure, can communicate securely within their designated zone. In some embodiments, the SCB can enforce communication rules and/or encryption protocols (e.g., referred to as policies, as discussed below) to protect the integrity and confidentiality of data exchanged within and/or across zones.

In some embodiments, the SCB can monitor, either via continuous collection and analysis of data and/or according to periodic intervals, swarm communications, such that events can be logged/recorded and determinations of security policies can be enforced. This, among other benefits, can aid in identifying and responding to potential security breaches and/or anomalies.

As such, secure zones, as managed by the SCB can serve as coordination centers for swarm activities among entities, thereby facilitating communication and data sharing among swarm members. Thus, as discussed herein, the SCB, via utilization of secure zones, can ensure that swarm communications are secure, controlled and efficient by providing a structured and protected environment for swarm nodes to operate within. For example, this can be essential for applications like drone swarms, autonomous vehicles, and/or Internet of Things (IoT) devices that require coordinated and secure communication in complex environments.

With reference to FIG. 1, system 100 is depicted which includes user equipment (UE) 102 (e.g., a client device, as mentioned above and discussed below in relation to FIG. 6), network 104, cloud system 106, database 108, and an SCB 200. It should be understood that while system 100 is depicted as including such components, it should not be construed as limiting, as one of ordinary skill in the art would readily understand that varying numbers of UEs, SCBs, cloud systems, databases and networks can be utilized; however, for purposes of explanation, system 100 is discussed in relation to the example depiction in FIG. 1.

According to some embodiments, UE 102 can be any type of swarm device, as discussed above. For example, UE 102 can include, but not be limited to, an autonomous vehicle (AV), autonomous machine, unmanned aerial vehicle (UAV), a mobile phone, tablet, laptop, game console, smart television (TV), IoT device, wearable device, and/or any other device equipped with a cellular or wireless or wired transceiver. In some embodiments, as discussed below, UE 102 can correspond to an AV that is traveling on public roads.

In some embodiments, network 104 can be any type of network, such as, but not limited to, a wireless network, cellular network, the Internet, and the like (as discussed above). Network 104 facilitates connectivity of the components of system 100, as illustrated in FIG. 1. Further discussion of embodiments of network 104 are provided below with reference to FIG. 5.

According to some embodiments, cloud system 106 may be any type of cloud operating platform and/or network based system upon which applications, operations, and/or other forms of network resources may be located. For example, system 106 may be a service provider and/or network provider from where services and/or applications may be accessed, sourced or executed from. For example, system 106 can represent the cloud-based architecture associated with a cellular provider—Verizon®, which has associated network resources hosted on the internet or private network (e.g., network 104), which enables (via SCB 200) the secure connection management discussed herein.

In some embodiments, cloud system 106 may include a server(s) and/or a database of information which is accessible over network 104. In some embodiments, a database 108 of cloud system 106 may store a dataset of data and metadata associated with local and/or network information related to a user(s) of the components of system 100 and/or each of the components of system 100 (e.g., UE 102 and the services and applications provided by cloud system 106 and/or SCB 200).

In some embodiments, for example, cloud system 106 can provide a private/proprietary management platform, whereby SCB 200, discussed infra, corresponds to the novel functionality system 106 enables, hosts and provides to a network 104 and other devices/platforms operating thereon.

According to some embodiments, database 108 may correspond to a data storage for a platform (e.g., a network hosted platform, such as cloud system 106, as discussed supra) or a plurality of platforms. Database 108 may receive storage instructions/requests from, for example, SCB 200 (and associated microservices), which may be in any type of known or to be known format, such as, for example, standard query language (SQL). According to some embodiments, database 108 may correspond to any type of known or to be known storage, for example, a memory or memory stack of a device, a distributed ledger of a distributed network (e.g., blockchain, for example), a look-up table (LUT), and/or any other type of secure data repository.

SCB 200, as discussed above and further below in more detail, can include components for the disclosed functionality. According to some embodiments, SCB 200 may be a special purpose machine or processor, and can be hosted by a device on network 104, within cloud system 106 and/or on UE 102. In some embodiments, SCB 200 may be hosted by a server and/or set of servers associated with cloud system 106.

According to some embodiments, as discussed in more detail below, SCB 200 may be configured to implement and/or control a plurality of services and/or microservices, where each of the plurality of services/microservices are configured to execute a plurality of workflows associated with performing the disclosed connection management. Non-limiting embodiments of such workflows are provided below in relation to at least FIG. 4.

According to some embodiments, as discussed above, SCB 200 may function as an application provided by cloud system 106. In some embodiments, SCB 200 may function as an application installed on a server(s), network location and/or other type of network resource associated with system 106. In some embodiments, SCB 200 may function as an application installed and/or executing on UE 102. In some embodiments, such application may be a web-based application accessed by UE 102. In some embodiments, SCB 200 may be configured and/or installed as an augmenting script, program or application (e.g., a plug-in or extension) to another application or program provided by cloud system 106 and/or executing on UE 102.

Figure 2:
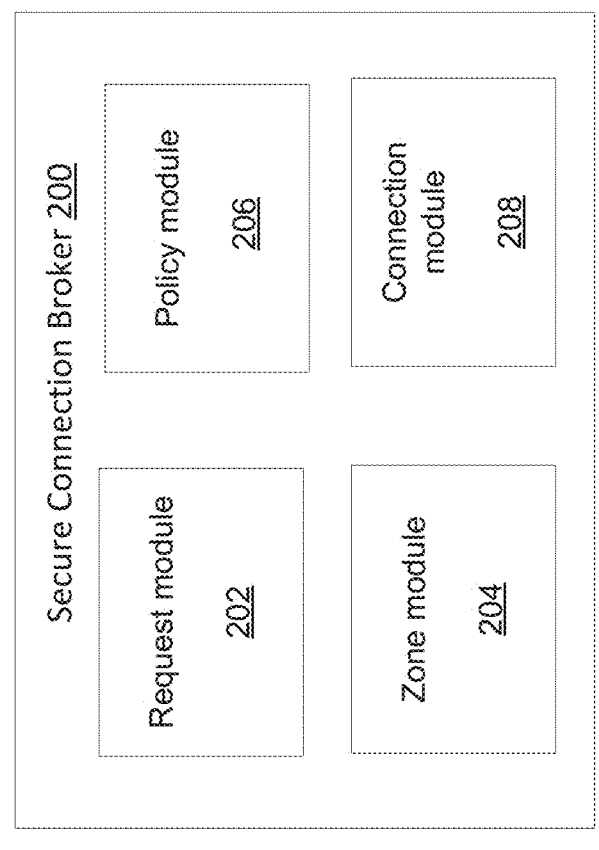
FIG. 2 is a block diagram illustrating components of an exemplary system according to some embodiments of the present disclosure.

As illustrated in FIG. 2, according to some embodiments, SCB 200 includes request module 202, zone module 204, policy module 206 and connection module 208. It should be understood that the connection broker(s) and modules discussed herein are non-exhaustive, as additional or fewer brokers and/or modules (or sub-modules) may be applicable to the embodiments of the systems and methods discussed. More detail of the operations, configurations and functionalities of SCB 200 and each of its modules, and their role within embodiments of the present disclosure will be discussed below.

Figure 3:
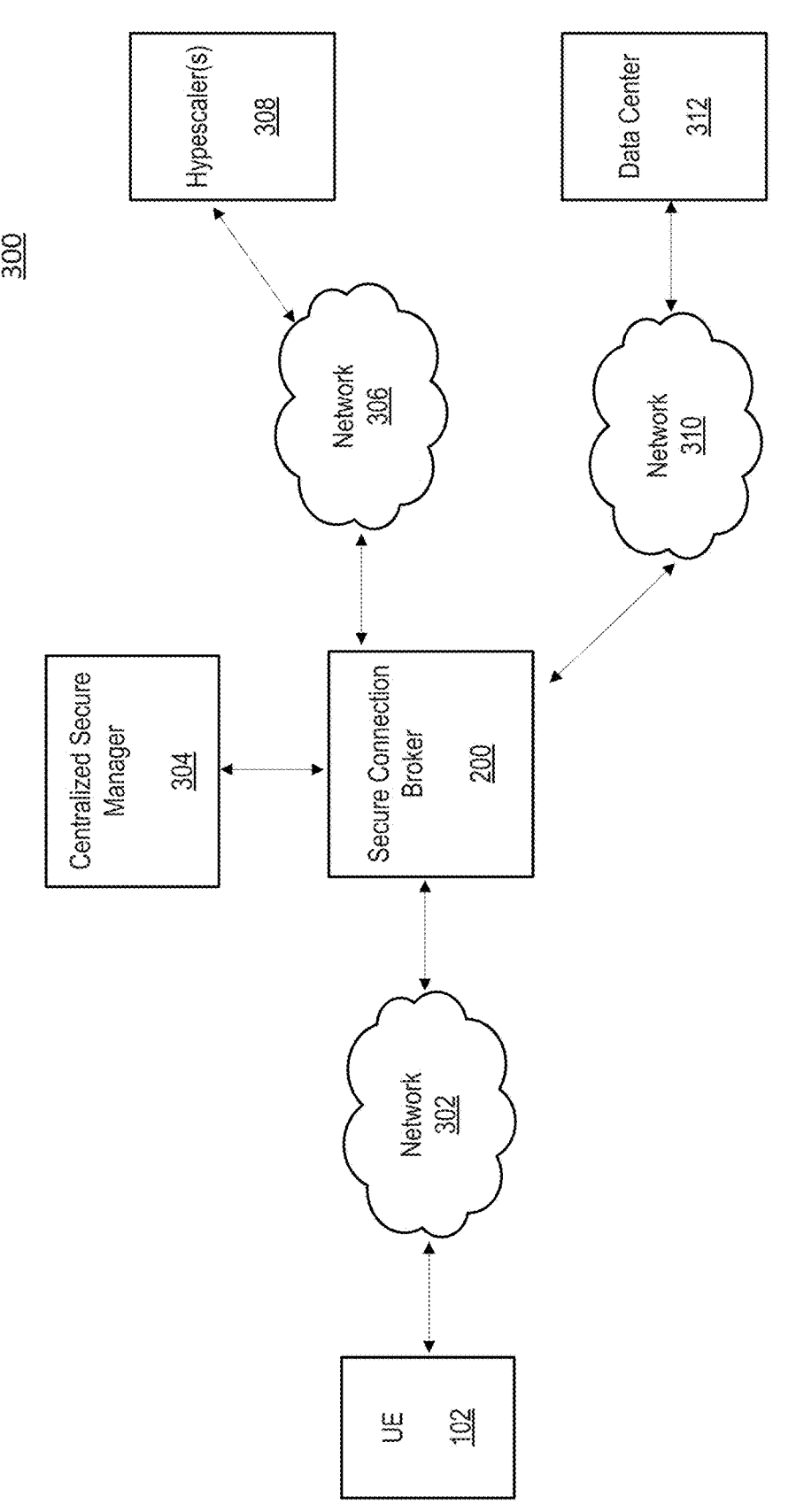
FIG. 3 illustrates a non-limiting example embodiment of an exemplary system according to some embodiments of the present disclosure.

Turning to FIG. 3, depicted is system 300, which includes UE 102, networks 302, 306 and 310, SCB 200, centralized secure manager 304, hyperscaler(s) 308 and data center 312.

According to some embodiment, as discussed herein and in more detail below, SCB 200 operates by enabling entities, such as, for example, UE 102, to join defined, secure zones, which enables communication with hyperscaler(s) 308 and/ or data center 312. As discussed herein, SCB 200 can enforce additional security and/or policies for UE 102's interactions with hyperscaler(s) 308 and/or data center 312.

According to some embodiments, hyperscaler(s) 308 can refer to at least one hyperscaler, which is a network resource for a service provider or organization that provides extensive computational resources and services to a user/customer base. According to some embodiments, hyperscaler(s) 308 can provide a wide range of services, including such cloud services, as, but not limited to, virtual machines, storage, databases, networking, artificial intelligence, machine learning, applications, and the like.

According to some embodiments, as discussed in more detail below with reference to Process 400 of FIG. 4, UE 102 can communicate with SCB 200 via network 302, whereby, requested access to an application hosted by a hyperscaler 308 can be provided via network 306. As provided below, in some embodiments, such access can be provided when the application (or associated network location/resource for the application) and UE 102 (or user of UE 102) are within different zones and/or application is being accessed over a public channel (e.g., network 306 is the Internet, for example). Therefore, as provided below, for example, SCB 200 can encrypt the communication to protect against public communication and/or the interaction among entities within different secured zones.

In some embodiments, data center 312 can operate similar to hyperscaler(s) 308, and can house secure data for trusted entities. Data center 312 can house/store electronic data related to applications, users, accounts and the like, and can provide physical and/or virtual environments for servers, network equipment and/or security measures for secure communications.

According to some embodiments, as discussed in more detail below with reference to Process 400 of FIG. 4, UE 102 can communicate with SCB 200 via network 302, whereby, requested access to an application hosted by a data center 312 can be provided via network 306. In this example, network 306 can be a private network, which can be accessed and/or enabled based on UE 102 and the application being within a same or related zone (e.g., an overlapping of zone coverage and/or policies) or among trusted zones, as discussed in more detail below.

According to some embodiments, SCB 200 can include and/or reference stored information that corresponds to the defined zones (e.g., logical groupings of entities), endpoints (e.g., digital points for entity, application and/or user information on a network (e.g., networks 306 or 308, for example)), policies for communication within and/or between zones and proxy implementations (as a digital proxy executed by SCB 200) that can accommodate and/or inject functions dynamically between communication among entities and/or zones. In some embodiments, for example, a digital proxy implemented by SCB 200 can, but is not limited to, log entire data, perform data loss prevention, apply encryption to communications/requests, and the like.

According to some embodiments, SCB 200 can execute (or run) on multi-access edge computing (MEC) locations, point of presence (PoP) locations and/or central office (CO) locations of a network(s). According to some embodiments, SCB 200 can be managed, controlled and/or programmed by centralized secure manager 304. In some embodiments, centralized secure manager 304 can manage one or more SCB 200s, and can operate to ensure the security and integrity of the tasks performed by SCB 200, as discussed below.

According to some embodiments, centralized secure manager 304 can act as a central control point for managing and overseeing various administrative and/or functional operations in a network, such as configuring devices, monitoring network activity and handling security policies, and the like. In some embodiments, centralized secure manager 304 can be responsible for enforcing security measures and policies, via SCB 200, to protect against unauthorized access, data breaches, and other security threats. In some embodiments, centralized secure manager 304 can verify the identity of users and devices attempting to perform management tasks and determines the level of access and privileges they are granted based on predefined authorization rules. In some embodiments, centralized secure manager 304 can secure communication channels between devices and entities (e.g., UE 102, hyperscaler(s) 308, data center 312 and networks 302, 306 and 310) and the SCB 200, using encryption and other security mechanisms to prevent eavesdropping and tampering.

Figure 4:
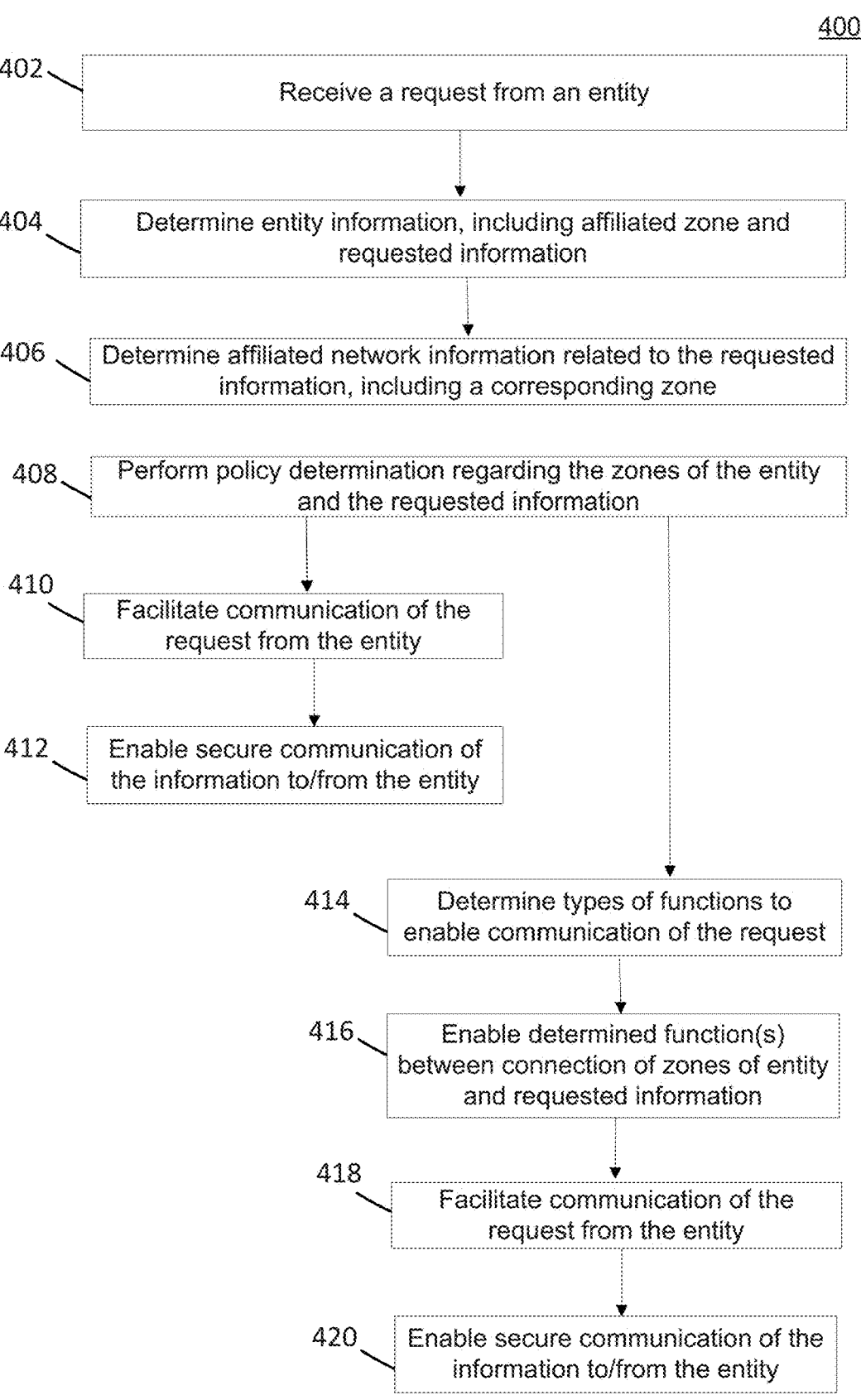
FIG. 4 illustrates an exemplary workflow according to some embodiments of the present disclosure.

In FIG. 4, Process 400 provides non-limiting example embodiments for secure swarm communications over a network. According to some embodiments, Step 402 of Process 400 can be performed by request module 202 of SCB 200; Steps 404 and 406 can be performed by zone module 204; Steps 408, 414 and 416 can be performed by policy module 206; and Steps 410, 412, 418 and 420 can be performed by connection module 208.

According to some embodiments, Process 400 begins with Step 402 where a request for information from an entity is received. While the discussion herein will focus on an entity requesting the information, embodiments exist where the entity is part of a plurality of entities requesting the same information. Thus, the steps and functionality discussed herein can be performed for each of the entities and as a swarm.

In some embodiments, the requested information can include and/or correspond to content, a context, real-time data, real-world and/or digital data, an application(s), another entity or entities, a network resource, and the like, or some combination thereof. As discussed above, at least with reference to FIG. 3, a request can be received from UE 102. For example, UE 102 can be a self-driving car, whereby UE 102, an application executing thereon (e.g., traffic application and/or weather application) and/or a user associated with UE 102 (e.g., the driver or passenger) may be requesting updated traffic data so that car may safely navigate the streets of a city during a rain storm.

In Step 404, based on the request, SCB 200 can determine information related to the request and the entity initiating such request. In some embodiments, the information determined in Step 404 can include information indicating which zone(s) the entity is part of (e.g., has access rights thereto).

According to some embodiments, Step 404 can involve SCB 200 parsing the request and determining, deriving, extracting or otherwise identifying information related to the entity (e.g., identifier (ID), name, type and the like) and the request (e.g., what is being requested, a date, time, geographic location, and the like). For example, an ID of the car, type of car and number of passengers in the car can be identified, as well which city blocks during time X can be determined. Accordingly, as discussed herein, traffic data for those blocks during time X can be obtained, which can additionally include information related to the weather during time X, as discussed above.

In some embodiments, Step 404 can further include leveraging the ID of the entity to determine zone information for the entity, which as discussed above, can enable the secure communication of the request and retrieval of the requested information from approved source entities. For example, in some embodiments, the ID of the entity can be identified and utilized as a query of database 108, whereby current zone affiliations can be retrieved (and utilized for processing of the request, as discussed infra).

In Step 406, SCB 200 can determine affiliated network information related to the requested information, which include the corresponding zone for where the requested information can be retrieved from (e.g., which entity is housing the requested information). According to some embodiments, Step 406 can operate in a similar manner as discussed above in relation to Step 404. For example, in some embodiments, SCB 200 can determine a location for the entity that houses and/or avails other entities to the requested information, upon which an ID can be identified. Such ID can then be leveraged to determine or otherwise identify the zone affiliations of such entity.

In Step 408, SCB 200 can perform policy determinations regarding the zones of the entity and the requested information (and/or the entity controlling and/or providing the requested information). In some embodiments, SCB 200 can perform a computational determination as to whether there are zone overlaps, or in other words, whether UE 102 has access rights to the information housed within the zone from where the requested information is located.

By way of a non-limiting example, car A is requesting traffic data for town B. The traffic data is housed by the municipality for town B-entity C. According to some embodiments, the policy determinations performed in Step 408 can involve determining whether car A and entity C are within the same zones (or related, for example, within overlapping zones as per their policies), and/or whether car A has approved access rights to the zone for which entity C is affiliated.

According to some embodiments, when the requesting entity and the entity housing/providing the requested information are within related zones (e.g., car A and entity C are within the same zone), processing can proceed to Step 410, wherein SCB 200 can enable, facilitate and/or cause direct communication between the entities. For example, with reference to FIG. 3, UE 102 can directly communicate with data center 312, discussed supra.

Thus, in Step 412, a secure connection and communication can be established which enables the request to be sent to the proper entity, for which retrieval and/or communication of the requested information can thereby be securely provided back to the requested entity.

Turning back to Step 408, according to some embodiments, when the requesting entity and the entity housing/providing the requested information are determined to be not trusted entities (or within zones that are not marked as trusted zones), processing can proceed to Step 414. For example, according to some embodiments, Step 408's policy determinations can include SCB 200 determining that car A (e.g., the requesting entity) and entity C (e.g., the entity housing the requested traffic data) are within different zones, and such zones are not trusted zones. For example, with reference to FIG. 3, UE 102 can communicate with hyperscaler(s) 308, discussed supra.

Accordingly, in Step 414, SCB 200 can determine types of functions that can enable secure communication of the request between entities. According to some embodiments, such functions can be directed to, but not limited to, securing the communications, auditing, data loss prevention, anomaly detection, and the like, or some combination thereof.

According to some embodiments, Step 414 can involve utilizing techniques, such as, for example, secure communication protocols and/or cryptographic methods, to enable secure communication among the untrusted communication environment of the entities. For example, such techniques can involve, but are not limited to, using secure protocols (e.g., Hypertext Transfer Protocol Secure (HTTPS), transport layer security (TLS), secure shell protocol (SSH), virtual private networks (VPNs), and the like), end-to-end encryption, digital signatures, public key infrastructure (PKI), and the like. Thus, any type of known or to be known technique that injects secure functionality to communication over a network between the entities can be utilized without departing from the scope of the instant disclosure.

In Step 416, upon identifying the types of functionality from Step 414, SCB 200 can operate to implement such secure functionality. In some embodiments, SCB 200 can, via a digital proxy, inject security features for the communication among entities, as discussed above. In some embodiments, the digital proxy can operate as a digital point on a network that operates as an application proxy that (activates and) connects and then terminates (or deactivates) on behalf of the requesting entity (e.g., UE 102).

In some embodiments, SCB 200 can utilize encryption when the source entity for the requested information (e.g., entity C, for example) is accessible over a public network (e.g., the Internet). For example, in some embodiments, SCB 200 can be configured to operate as an application router on a network to determine a path to the source entity (e.g., entity C), and establish a secure datagram transport layer security (DTLS) tunnel with the location of the source entity. Thus, for example, car A can communicate over the Internet via a created DTLS tunnel with entity C.

In Step 418, communication between the requesting entity and the entity housing/providing the requested information (e.g., referred to as a source entity, for example) can be enabled, facilitated and/or caused. Such communication can be implemented via the functionality identified in Step 414 and implemented in Step 416, discussed supra.

And, in Step 420, a secure connection and communication can be established which enables the request to be sent to the proper entity, for which retrieval and/or communication of the requested information can thereby be securely provided back to the requested entity.

Thus, as provided above, SCB 200 can ensure and enable communications among entities are secure and controlled via the structured and protected environment for such networked nodes to operate thereon and therebetween.

Figure 5:
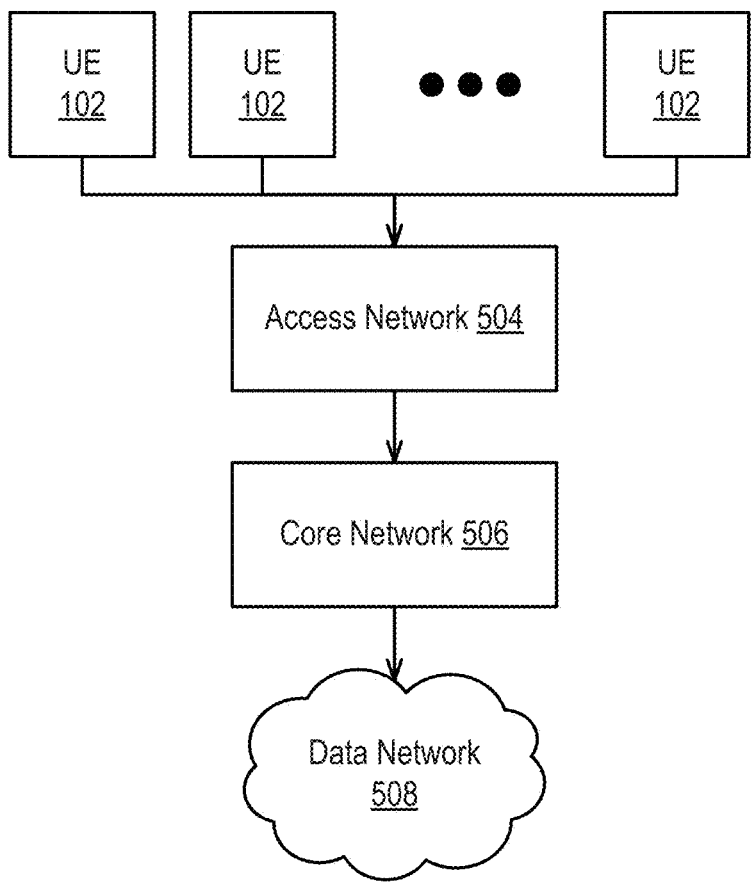
FIG. 5 illustrates a non-limiting example embodiment of a network architecture according to some embodiments of the present disclosure.

FIG. 5 is a block diagram of an example network architecture according to some embodiments of the present disclosure. In the illustrated embodiment, UE 102 accesses a data network 508 via an access network 504 and a core network 506.

In the illustrated embodiment, the access network 504 comprises a network allowing network communication with UE 102. In general, the access network 504 includes at least one base station that is communicatively coupled to the core network 506 and coupled to zero or more UE 102.

In some embodiments, the access network 504 comprises a cellular access network, for example, a 5G network. In an embodiment, the access network 504 can include a NextGen Radio Access Network (NG-RAN). In an embodiment, the access network 504 includes a plurality of next Generation Node B (e.g., eNodeB and gNodeB) base stations connected to UE 102 via an air interface. In one embodiment, the air interface comprises a New Radio (NR) air interface. For example, in a 5G network, individual user devices can be communicatively coupled via an X2 interface.

In the illustrated embodiment, the access network 504 provides access to a core network 506 to UE 102. In the illustrated embodiment, the core network may be owned and/or operated by a network operator (NO) and provides wireless connectivity to UE 102. In the illustrated embodiment, this connectivity may comprise voice and data services.

At a high-level, the core network 506 may include a user plane and a control plane. In one embodiment, the control plane comprises network elements and communications interfaces to allow for the management of user connections and sessions. By contrast, the user plane may comprise network elements and communications interfaces to transmit user data from UE 102 to elements of the core network 506 and to external network-attached elements in a data network 508 such as the Internet.

In the illustrated embodiment, the access network 504 and the core network 506 are operated by a NO. However, in some embodiments, the networks (504, 506) may be operated by a private entity and may be closed to public traffic. For example, the components of the network 506 may be provided as a single device, and the access network 504 may comprise a small form-factor base station. In these embodiments, the operator of the device can simulate a cellular network, and UE 102 can connect to this network similar to connecting to a national or regional network.

In some embodiments, the access network 504, core network 506 and data network 508 can be configured as a MEC network, where MEC or edge nodes are embodied as each UE 102 and are situated at the edge of a cellular network, for example, in a cellular base station or equivalent location. In general, the MEC or edge nodes may comprise UEs that comprise any computing device capable of responding to network requests from another UE 102 (referred to generally for example as a client) and is not intended to be limited to a specific hardware or software configuration of a device.

Figure 6:
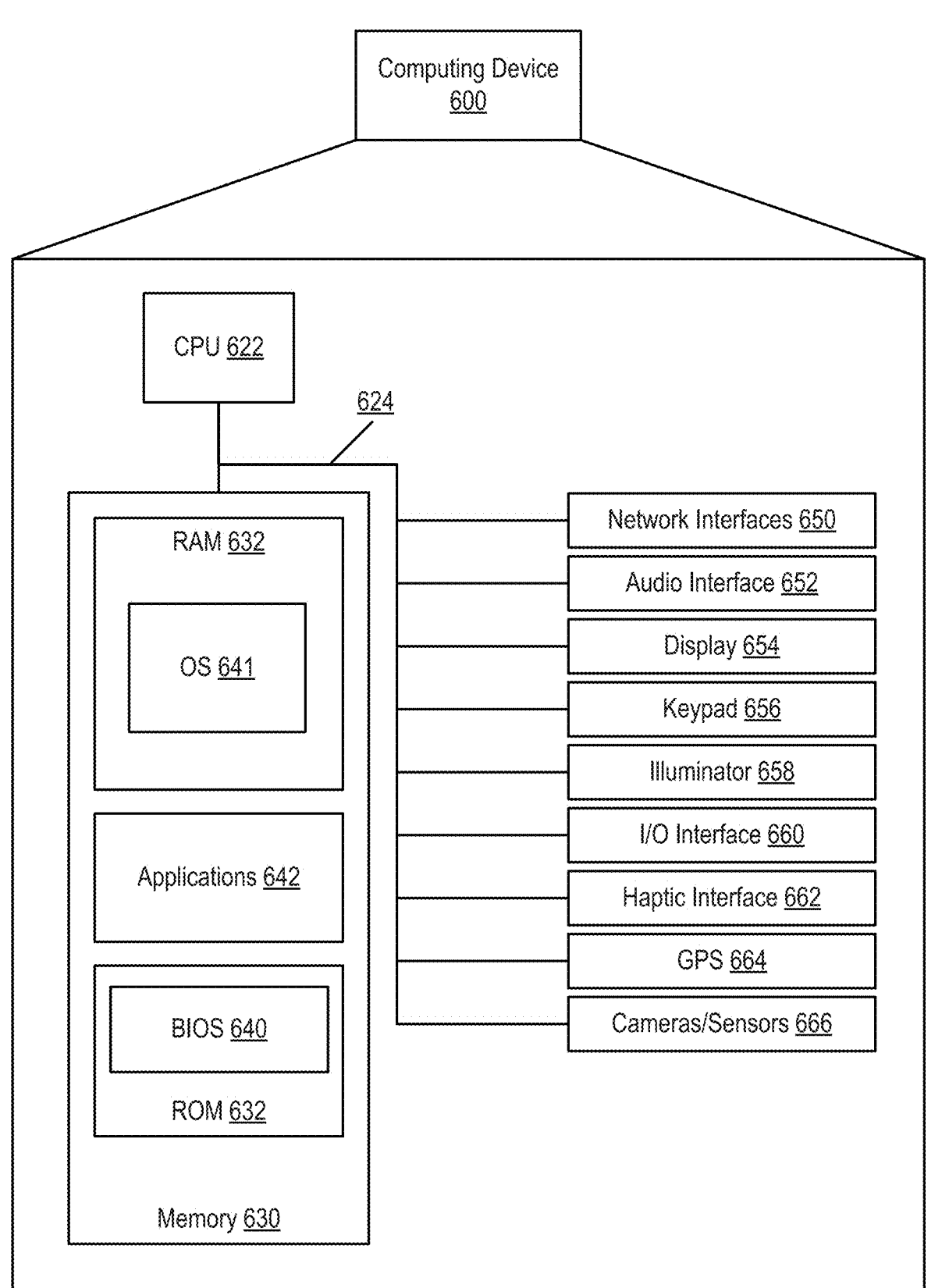
FIG. 6 is a block diagram illustrating a computing device showing an example of a client or server device used in various embodiments of the present disclosure.

FIG. 6 is a block diagram illustrating a computing device showing an example of a client or server device used in the various embodiments of the disclosure.

The computing device 600 may include more or fewer components than those shown in FIG. 6, depending on the deployment or usage of the device 600. For example, a server computing device, such as a rack-mounted server, may not include audio interfaces 652, displays 654, keypads 656, illuminators 658, haptic interfaces 662, GPS receivers 664, or cameras/sensors 666. Some devices may include additional components not shown, such as graphics processing unit (GPU) devices, cryptographic co-processors, artificial intelligence (AI) accelerators, or other peripheral devices.

As shown in FIG. 6, the device 600 includes a CPU 622 in communication with a mass memory 630 via a bus 624. The computing device 600 also includes one or more network interfaces 650, an audio interface 652, a display 654, a keypad 656, an illuminator 658, an input/output interface 660, a haptic interface 662, an optional global positioning systems (GPS) receiver 664 and a camera(s) or other optical, thermal, or electromagnetic sensors 666. Device 600 can include one camera/sensor 666 or a plurality of cameras/sensors 666. The positioning of the camera(s)/sensor(s) 666 on the device 600 can change per device 600 model, per device 600 capabilities, and the like, or some combination thereof.

In some embodiments, the CPU 622 may comprise a general-purpose CPU. The CPU 622 may comprise a single-core or multiple-core CPU. The CPU 622 may comprise a system-on-a-chip (SoC) or a similar embedded system. In some embodiments, a GPU may be used in place of, or in combination with, a CPU 622. Mass memory 630 may comprise a dynamic random-access memory (DRAM) device, a static random-access memory device (SRAM), or a Flash (e.g., NAND Flash) memory device. In some embodiments, mass memory 630 may comprise a combination of such memory types. In one embodiment, the bus 624 may comprise a Peripheral Component Interconnect Express (PCIe) bus. In some embodiments, the bus 624 may comprise multiple busses instead of a single bus.

Mass memory 630 illustrates another example of computer storage media for the storage of information such as computer-readable instructions, data structures, program modules, or other data. Mass memory 630 stores a basic input/output system ("BIOS") 640 for controlling the low-level operation of the computing device 600. The mass memory also stores an operating system 641 for controlling the operation of the computing device 600.

Applications 642 may include computer-executable instructions which, when executed by the computing device 600, perform any of the methods (or portions of the methods) described previously in the description of the preceding Figures. In some embodiments, the software or programs implementing the method embodiments can be read from a hard disk drive (not illustrated) and temporarily stored in RAM 632 by CPU 622. CPU 622 may then read the software or data from RAM 632, process them, and store them to RAM 632 again.

The computing device 600 may optionally communicate with a base station (not shown) or directly with another computing device. Network interface 650 is sometimes known as a transceiver, transceiving device, or network interface card (NIC).

The audio interface 652 produces and receives audio signals such as the sound of a human voice. For example, the audio interface 652 may be coupled to a speaker and microphone (not shown) to enable telecommunication with others or generate an audio acknowledgment for some action. Display 654 may be a liquid crystal display (LCD), gas plasma, light-emitting diode (LED), or any other type of display used with a computing device. Display 654 may also include a touch-sensitive screen arranged to receive input from an object such as a stylus or a digit from a human hand.

Keypad 656 may comprise any input device arranged to receive input from a user. Illuminator 658 may provide a status indication or provide light.

The computing device 600 also comprises an input/output interface 660 for communicating with external devices, using communication technologies, such as USB, infrared, Bluetooth™, or the like. The haptic interface 662 provides tactile feedback to a user of the client device.

The optional GPS transceiver 664 can determine the physical coordinates of the computing device 600 on the surface of the Earth, which typically outputs a location as latitude and longitude values. GPS transceiver 664 can also employ other geo-positioning mechanisms, including, but not limited to, triangulation, assisted GPS (AGPS), E-OTD, CI, SAI, ETA, BSS, or the like, to further determine the physical location of the computing device 600 on the surface of the Earth. In one embodiment, however, the computing device 600 may communicate through other components, providing other information that may be employed to determine a physical location of the device, including, for example, a MAC address, IP address, or the like.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/ acts specified in the block diagrams or operational block or blocks. In some alternate implementations, the functions/ acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

To the extent the aforementioned implementations collect, store, or employ personal information of individuals, groups, or other entities, it should be understood that such information shall be used in accordance with all applicable laws concerning the protection of personal information. Additionally, the collection, storage, and use of such information can be subject to the consent of the individual to such activity, for example, through well known "opt-in" or "opt-out" processes as can be appropriate for the situation and type of information. Storage and use of personal information can be in an appropriately secure manner reflective of the type of information, for example, through various access control, encryption, and anonymization techniques (for especially sensitive information).

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

What is claimed is:

1. A method comprising:

receiving, from a first entity, a request for information from a second entity;

determining, based on analysis of the request, a secure zone for the first entity and a secure zone for the second entity, each secure zone being a logical network of network nodes for which trusted network communications are enabled;

determining, based on the secure zones of the first entity and the second entity, a policy determination regarding handling of the request, the policy determination corresponding to functionality for establishing a network connection between the first entity and the second entity respective to the request;

activating a digital proxy on behalf of the first entity, the activation comprising dynamically injecting a function into the digital proxy according to a policy;

establishing, based on the policy determination and the activation of the digital proxy, the network connection between the first entity and the second entity;

causing communication of the request from the first entity to the second entity via the established network connection, the caused communication enabling the first entity to retrieve the requested information from the second entity; and deactivating the digital proxy upon the retrieval of the requested information from the second entity.

2. The method of claim 1, wherein:

the request comprises a first request;

the policy determination comprises a first policy determination;

the network connection comprises a first network connection; and the method further comprises:

receiving, from a third entity, a second request for information from a fourth entity;

determining, based on analysis of the second request, a secure zone for the third entity and a secure zone for the fourth entity, the secure zones of the third entity and the fourth entity each being a logical network of network nodes for which trusted network communications are enabled;

determining, based on the secure zones of the third entity and the fourth entity, a second policy determination regarding handling of the second request, the second policy determination corresponding to functionality for establishing a second network connection between the third entity and the fourth entity respective to the second request, wherein the second policy determination comprises an indication that the secure zone of the third entity and the secure zone of the fourth entity are related;

establishing, based on the second policy determination, the second network connection between the third entity and the fourth entity; and causing communication of the second request from the third entity to the fourth entity via the established second network connection, the caused communication of the second request enabling the third entity to retrieve the requested information from the fourth entity.

3. The method of claim 2, wherein the second network connection between the third entity and the fourth entity involves a private network associated with the secure zones of the third entity and the fourth entity.

4. The method of claim 1, wherein the policy determination comprises an indication that the secure zone of the first entity and the second zone of the second entity are not-trusted zones.

5. The method of claim 4, further comprising:

determining that the network connection is a public network; and performing end-to-end encryption of the communication of the request and retrieval of the requested information.

6. The method of claim 4, further comprising:

establishing a datagram transport layer security (DTLS) tunnel with a network location of the second entity, wherein the network connection is established via the DTLS tunnel.

7. The method of claim 1, wherein the first entity is a part of a plurality of entities requesting the information.

8. The method of claim 1, wherein the requested information corresponds to real-world activity at a location, the location corresponding to a current position of the first entity.

9. The method of claim 8, wherein the real-world activity comprises traffic data.

10. A network device comprising:

a hardware processor configured to:

receive, from a first entity, a request for information from a second entity;

determine, based on analysis of the request, a secure zone for the first entity and a secure zone for the second entity, each secure zone being a logical network of network nodes for which trusted network communications are enabled;

determine, based on the secure zones of the first entity and the second entity, a policy determination regarding handling of the request, the policy determination corresponding to functionality for establishing a network connection between the first entity and the second entity respective to the request;

activate a digital proxy on behalf of the first entity, the activation comprising dynamically injecting a function into the digital proxy according to a policy;

establish, based on the policy determination and the activation of the digital proxy, the network connection between the first entity and the second entity;

cause communication of the request from the first entity to the second entity via the established network connection, the caused communication enabling the first entity to retrieve the requested information from the second entity; and deactivate the digital proxy upon the retrieval of the requested information from the second entity.

11. The network device of claim 10, wherein:

the request comprises a first request;

the policy determination comprises a first policy determination;

the network connection comprises a first network connection; and the hardware processor is further configured to:

receive, from a third entity, a second request for information from a fourth entity;

determine, based on analysis of the second request, a secure zone for the third entity and a secure zone for the fourth entity, the secure zones of the third entity and the fourth entity each being a logical network of network nodes for which trusted network communications are enabled;

determine, based on the secure zones of the third entity and the fourth entity, a second policy determination regarding handling of the second request, the second policy determination corresponding to functionality for establishing a second network connection between the third entity and the fourth entity respective to the second request, wherein the second policy determination comprises an indication that the secure zone of the third entity and the secure zone of the fourth entity are related, wherein the second network connection between the third entity and the fourth entity involves a private network associated with the secure zones of the third entity and the fourth entity;

establish, based on the second policy determination, the second network connection between the third entity and the fourth entity; and cause communication of the second request from the third entity to the fourth entity via the established second network connection, the caused communication of the second request enabling the third entity to retrieve the requested information from the fourth entity.

12. The network device of claim 10, wherein the policy determination comprises an indication that the secure zone of the first entity and the secure zone of the second entity are not-trusted zones.

13. The network device of claim 12, wherein the hardware processor is further configured to:

determine that the network connection is a public network;

establish a datagram transport layer security (DTLS) tunnel with a network location of the second entity, wherein the network connection is established via the DTLS tunnel; and perform end-to-end encryption of the communication of the request and retrieval of the requested information.

14. A non-transitory computer-readable storage medium storing instructions, executable by a network device, wherein the instructions are configured to:

receive, from a first entity, a request for information from a second entity;

determine, based on analysis of the request, a secure zone for the first entity and a secure zone for the second entity, each secure zone being a logical network of network nodes for which trusted network communications are enabled;

determine, based on the secure zones of the first entity and the second entity, a policy determination regarding handling of the request, the policy determination corresponding to functionality for establishing a network connection between the first entity and the second entity respective to the request;

activate a digital proxy on behalf of the first entity, the activation comprising dynamically injecting a function into the digital proxy according to a policy;

establish, based on the policy determination and the activation of the digital proxy, the network connection between the first entity and the second entity;

cause communication of the request from the first entity to the second entity via the established network connection, the caused communication enabling the first entity to retrieve the requested information from the second entity; and deactivate the digital proxy upon the retrieval of the requested information from the second entity.

15. The non-transitory computer-readable storage medium of claim 14, wherein:

the request comprises a first request;

the policy determination comprises a first policy determination;

the network connection comprises a first network connection; and the instructions are further configured to:

receive, from a third entity, a second request for information from a fourth entity;

determine, based on analysis of the second request, a secure zone for the third entity and a secure zone for the fourth entity, the secure zones of the third entity and the fourth entity each being a logical network of network nodes for which trusted network communications are enabled;

determine, based on the secure zones of the third entity and the fourth entity, a second policy determination regarding handling of the second request, the second policy determination corresponding to functionality for establishing a second network connection between the third entity and the fourth entity respective to the second request, wherein the second policy determination comprises an indication that the secure zone of the third entity and the secure zone of the fourth entity are related, wherein the second network connection between the third entity and the fourth entity involves a private network associated with the secure zones of the third entity and the fourth entity;

establish, based on the second policy determination, the second network connection between the third entity and the fourth entity; and cause communication of the second request from the third entity to the fourth entity via the established second network connection, the caused communication of the second request enabling the third entity to retrieve the requested information from the fourth entity.

16. The non-transitory computer-readable storage medium of claim 14, wherein the policy determination comprises an indication that the secure zone of the first entity and the second zone of the second entity are not-trusted zones.

17. The non-transitory computer-readable storage medium of claim 16, wherein the instructions are further configured to:

determine that the network connection is a public network;

establish a datagram transport layer security (DTLS) tunnel with a network location of the second entity, wherein the network connection is established via the DTLS tunnel; and perform end-to-end encryption of the communication of the request and retrieval of the requested information.

* * * * *